United States Patent
Eklund

(10) Patent No.: US 12,316,574 B2
(45) Date of Patent: May 27, 2025

(54) WIRELESS COMMUNICATION SYSTEM FOR AN EVACUATED TUBE TRANSPORTATION SYSTEM

(71) Applicant: Icomera AB, Gothenburg (SE)

(72) Inventor: Peter Eklund, Gothenburg (SE)

(73) Assignee: Icomera AB, Gothenburg (SE)

( * ) Notice: Subject to any disclaimer, the term of this patent is extended or adjusted under 35 U.S.C. 154(b) by 423 days.

(21) Appl. No.: 17/579,318

(22) Filed: Jan. 19, 2022

(65) Prior Publication Data
US 2022/0231819 A1 Jul. 21, 2022

(30) Foreign Application Priority Data
Jan. 20, 2021 (SE) .................................... 2150057-4

(51) Int. Cl.
*H04L 5/00* (2006.01)
*H04W 88/14* (2009.01)
*H04W 88/16* (2009.01)

(52) U.S. Cl.
CPC .......... *H04L 5/0055* (2013.01); *H04L 5/0046* (2013.01); *H04W 88/14* (2013.01); *H04W 88/16* (2013.01)

(58) Field of Classification Search
CPC ..... H04L 5/003; H04L 5/0042; H04L 5/0044; H04L 5/0046; H04L 5/0055; H04L 5/0058; H04L 5/0069; H04W 88/14; H04W 88/16
See application file for complete search history.

(56) References Cited

U.S. PATENT DOCUMENTS

| 7,483,412 B2 | 1/2009 | Abhishek et al. |
| 10,461,421 B1 * | 10/2019 | Tran ...................... H04W 24/02 |
| 2007/0179689 A1 * | 8/2007 | Soulie ................. H04W 36/324 |
| | | 701/19 |

(Continued)

FOREIGN PATENT DOCUMENTS

| CN | 109996208 A | 7/2019 |
| CN | 110290501 A | 9/2019 |

(Continued)

OTHER PUBLICATIONS

Extended European Search Report for European Application No. 22151835.0, mailed Jun. 21, 2022, (21 pages).

(Continued)

*Primary Examiner* — Kevin D Mew
(74) *Attorney, Agent, or Firm* — Kagan Binder, PLLC

(57) ABSTRACT

A wireless communication system for an evacuated tube transportation system, wherein the evacuated transportation system comprises a tube or tunnel which is at least partly evacuated to provide a low-pressure within the tube/tunnel, and a guiding structure to guide a moving capsule along the tube/tunnel. The wireless communication system comprises a plurality of base stations arranged on the inside of the tube/tunnel, distributed along the length of the tube/tunnel, and connected together in a backbone communication path, the communication path further being connected to an exterior network, enabling communication with at least one stationary communication server outside the tube/tunnel, and wherein the moving capsule comprises a router for communication with said base stations.

22 Claims, 6 Drawing Sheets

(56) References Cited

U.S. PATENT DOCUMENTS

| | | | |
|---|---|---|---|
| 2011/0075961 A1* | 3/2011 | Herrmann, Jr. | H01L 31/0549 |
| | | | 385/2 |
| 2012/0136621 A1* | 5/2012 | Inomata | G01S 13/605 |
| | | | 702/143 |
| 2014/0081531 A1* | 3/2014 | Smith | G05D 1/0274 |
| | | | 701/50 |
| 2017/0179689 A1* | 6/2017 | Kawano | B21H 3/04 |
| 2017/0222903 A1 | 8/2017 | Karlsson et al. | |
| 2018/0063261 A1* | 3/2018 | Moghe | G08G 1/123 |
| 2018/0102985 A1* | 4/2018 | Byers | H04L 47/80 |
| 2020/0021030 A1* | 1/2020 | Bates | H01P 1/2084 |
| 2020/0039549 A1 | 2/2020 | Gresset | |
| 2020/0186233 A1 | 6/2020 | Park | |
| 2021/0185493 A1 | 6/2021 | Legg et al. | |

FOREIGN PATENT DOCUMENTS

| | | | | |
|---|---|---|---|---|
| EP | 3104636 | A1 | 12/2016 | |
| EP | 3200378 | A1 | 8/2017 | |
| EP | 3708457 | A2 | 9/2020 | |
| EP | 3708457 | A3 | 10/2020 | |
| WO | WO-2010028278 | A2 * | 3/2010 | H04W 4/20 |
| WO | WO-2010055655 | A1 * | 5/2010 | H03J 7/047 |
| WO | 2019120479 | A1 | 6/2019 | |
| WO | 2019226114 | A1 | 11/2019 | |

OTHER PUBLICATIONS

Swedish Office Action for Swedish Application No. 2150057-4 mailed Dec. 19, 2022 (7 pages).
Swedish Office Action for Swedish Application No. 2150057-4, mailed Sep. 27, 2021, (13 pages).
Espacenet English language abstract for CN 109996208.
Espacenet English language abstract for CN 110290501.

\* cited by examiner

WIRELESS COMMUNICATION SYSTEM FOR AN EVACUATED TUBE TRANSPORTATION SYSTEM

CROSS-REFERENCE TO RELATED APPLICATIONS

This application claims priority to Swedish Patent Application having serial number 2150057-4, filed Jan. 20, 2021 and titled "WIRELESS COMMUNICATION SYSTEM FOR AN EVACUATED TUBE TRANSPORTATION SYSTEM", of which is incorporated herein by reference in their entirety.

TECHNICAL FIELD OF THE INVENTION

The present invention relates to a wireless communication system for an evacuated tube transportation system, i.e. a system with a tube or tunnel which is at least partly evacuated to provide a low-pressure within the tube/tunnel, and with a guiding structure to guide moving capsules, such as trains or pods. In particular the system allows more efficient communication between the moving capsule and stationary base stations, connected to an external communication network, using e.g. a WLAN standard, and in particular using the IEEE 802.11 standard.

BACKGROUND

The demands on wireless communication capabilities in today's society are increasing rapidly. In particular, fast and easily accessible communication is desired through hand-held devices over large areas. It is particularly challenging to achieve such communication for mobile devices which are moving, e.g. when moving over large distances with poor network coverage or when affected by unknown sources of noise interrupting a signal for communication, such as clients moving on e.g. trains, airplanes, and other types of moving vehicles. In particular, if a client, such as a mobile phone, moves over large areas the client has to connect to several base stations in order to maintain a sufficient connection for communication. To provide wireless communication systems for passengers on public transportation vehicles has posed great difficulties in the past, and much endeavor has been spent to achieve useful systems.

At the same time, there is today an increasing demand from passengers to be able to communicate through mobile phones and other handheld terminals when travelling on e.g. trains, and also to be able to get access to the Internet with laptops, PDAs etc. Further, with the new smartphones, and the way these are used, with e.g. continuously operating applications, many phones are active at all times, meaning that many handovers are required when the train moves. Even though this problem is common for all moving vehicles, it is especially pronounced for vehicles moving at high speed, such as trains and airplanes.

Generally, there has for long existed four types of transportation systems: transportation on roads, such as with cars and busses, transportation on rails, such as with trains, transportation on water, such as with ships, and transportation in air, such as with aircrafts. However, a fifth type of transportation system has recently been much discussed, viz. transportation in evacuated tubes, also referable to as vacuum tubes. This idea is not new—a similar idea of a so-called vactrain was presented by George Medhurst already in 1827, and since then various similar ideas have been presented over the years. However, it is only in the last few years, after involvement of companies such as SpaceX and Tesla, and their Hyperloop concept, that this idea has been made practically feasible. A working Hyperloop test track has been built by SpaceX in Hawthorne, USA, and another test track has been built by Hyperloop Transportation Technologies (HTT) in Toulouse, France (expected to be put in operation in April, 2020), and in addition many full-scale Hyperloop routes are planned or under construction.

There will be a similar need for efficient wireless communication also in such evacuated tube transportation systems as in conventional types of transportation systems. However, wireless communication for evacuated tube transportation faces new and more difficult problems than other types of transportation.

Since transportation occurs in tubes or tunnels, which are typically made of steel, the wall of the tube/tunnel will function as a shield, preventing transmission of electromagnetic waves therethrough. Thus, antennas in or on the moving capsule will be unable to connect to already existing cellular base stations and the like. Further, the capsules will travel at very high speed—a speed of at least 1200 km/h is in the plans for the current Hyperloop projects, and even higher speeds are expected in the future—which makes handovers and the like between different base stations problematic. Still further, due to the relatively narrow tubes/tunnels used—typically the tubes will have a diameter of a few meters—and the curvature of the earth surface, a direct line of sight within the tubes will be limited to a few kilometers.

There is therefore a need for a wireless communication system for communicating with capsules in an evacuated tube transportation system, which addresses the above-discussed difficulties. In particular, there is a need for a wireless communication system allowing high data throughput and capacity, capacity utilization and quality, and which is still cost-efficient to build, maintain and operate.

SUMMARY OF THE INVENTION

It is therefore an object of the present invention to provide a wireless communication system for evacuated tube transportation systems, and in particular for communication with moving capsules within such a system, which alleviates all or at least some of the above-discussed difficulties related to such a transportation system.

This object is achieved by means of a wireless communication system and a mobile router as defined in the appended claims.

According to a first aspect of the present invention, there is provided a wireless communication system for an evacuated tube transportation system,
  wherein the evacuated transportation system comprises a tube or tunnel which is at least partly evacuated to provide a low-pressure within the tube/tunnel, and a guiding structure to guide a moving capsule along the tube/tunnel,
  wherein the wireless communication system comprises a plurality of base stations arranged on the inside of the tube/tunnel, distributed along the length of the tube/tunnel, and connected together in a backbone communication path, the communication path further being connected to an exterior network, enabling communication with at least one stationary communication server outside the tube/tunnel, and
  wherein the moving capsule comprises a router for communication with said base stations.

The "router" or "mobile router" is a networking router, which is a machine that forwards data packets between computer networks, on at least one data link in each direction. The router may be a mobile access router, and preferably a mobile access and applications router.

By "evacuated transportation system" is here meant any type of transportation where capsules travel within a tube or tunnel which is at least partly evacuated to provide a low-pressure within the tube/tunnel. The low-pressure may be referred to as vacuum, and would typically be less than 200 Pa, and preferably about 100 Pa, i.e. about 1% of atmospheric air pressure. Hereby, the air resistance is reduced to almost nothing. The capsules may be any type of capsule for carrying passengers and/or cargo, such as pods, trains and the like. The capsules are preferably arranged to be lifted above the guiding structure, e.g. by an air flow directed downwardly, air bearings, or by magnetic levitation, maglev, to reduce the friction between the capsule and the tube/tunnel. Propulsion for the capsule may be provided in various ways. For example, the capsules may be driven by an active transfer of air from the front to the rear of the vessel, with an electrically driven fan and axial compressor. Alternatively, linear induction motors may be located long the tube to accelerate and decelerate the capsule. However, other ways for providing propulsion to the capsule are also feasible.

The tubes may be arranged on the ground, and for example at an elevated position, on pillars or the like. However, the tubes may also be arranged as underground or submersed tunnels.

The present invention is based on the understanding that a very good wireless communication with the capsule, with high throughput and capacity, and high quality, can be obtained by provision of a plurality of base stations arranged on the inside of the tube/tunnel, distributed along the length of the tube/tunnel, and connected together in a backbone communication path. This communication path is further connected to an exterior network, by antennas arranged exterior of the tube/tunnel, thereby enabling communication with at least one stationary communication server outside the tube/tunnel. For communication with the internal base stations, the moving capsule comprises a router.

Such a system can be built, operated and maintained relatively cost-efficiently.

The invention is based on the realization that the evacuated tubes have walls which are at least to some extent inwardly reflective for electromagnetic radiation, thereby functioning essentially as waveguides for the electromagnetic waves, which makes communication between the base stations and the capsule possible even in cases where there is no direct line of sight. This makes it easier to find suitable locations for the base stations inside the tunnels, since the base stations do hereby not need to be placed at any specific height, etc. Due to these waveguide properties of the tunnel, the communication can also occur over longer distances than obtainable by only direct line-of-sight communication, such as over more than 5 kilometers, more than 10 kilometers, more than 20 kilometers, or even farther.

Further, the invention is based on the realization that electromagnetic waves propagate better, with higher speed and less attenuation, in vacuum than in air. This, together with the waveguide properties of the tunnel, makes it possible to arrange the base stations farther away from each other, with relatively great separation distances. This makes the system easier and less costly to install, and also makes the communication performance better, e.g. by reducing the number of handovers, etc.

In particular, the communication between the base stations and the moving capsule may be provided in a frequency band in the range of 55-75 GHz, and preferably in a frequency band around 60 GHz. This frequency band is in most countries designated for unlicensed operation. However, in ordinary atmosphere, this frequency band is of limited usefulness, since electromagnetic waves at these frequencies have very high atmospheric attenuation, and are quickly absorbed by the oxygen in the air. Oxygen has an absorption peak at about this frequency. Thus, electromagnetic waves at this frequency band normally have very limited propagation distance, at best just a few meters. However, in an evacuated tube, there is almost no oxygen, and consequently almost no attenuation of the electromagnetic waves in this frequency band, allowing the electromagnetic waves to propagate over very large distances, such as tens of kilometers or more.

In one embodiment, at least some of the base stations communicate with the moving capsule at different sub-bands or channels within the used frequency band. Hereby, the interference between the base-stations is reduced, and it is easier for the capsule to distinguish between the communication from different base stations.

In one embodiment, one of the communication standards IEEE 802.11ad and IEEE 802.11ag may be used. If, for example, the IEEE 802.11ad or IEEE 802.11ag standards are used, these standards define the following six different sub-bands/channels:

| Channel | Center (GHz) | Min. (GHz) | Max, (GHz) |
|---|---|---|---|
| 1 | 58.32 | 57.24 | 59.40 |
| 2 | 60.48 | 59.40 | 61.56 |
| 3 | 62.64 | 61.56 | 63.72 |
| 4 | 64.80 | 63.72 | 65.88 |
| 5 | 66.96 | 65.88 | 68.04 |
| 6 | 69.12 | 68.04 | 70.20 |

However, some of these channels are not, at present, allowed for unlicensed use in some countries. For example, all channels are allowed in the US, whereas e.g. the EU countries, Russia, Japan and Australia only allow channels 1-4, South Korea and Canada only channels 1-3, and China only channels 2-3.

In one embodiment, adjacent base stations are arranged to communicate with the moving capsule at different sub-bands/channels. Thus, all base stations may e.g. communicate with the moving capsule at different sub-bands/channels, so that no neighboring base stations communicates on the same sub-bands/channels. Thus, in one embodiment, every base station is arranged to communicate with the moving capsule at a different sub-band/channel than any of the first and second neighbor base stations.

For example, the base stations located after each other along the evacuated tube may be arranged to operate at the different sub-bands/channels in a sequential order, wherein the sequential order comprises at least two different sub-bands/channels, and more preferably at least three different sub-bands/channels, and most preferably at least four sub-bands/channels. If e.g. two sub-bands/channels are used, every other base station may be using a first sub-band/channel, A, and the others using a second sub-band/channel, B, to form the sequential order A-B-A-B-A- . . . . Thus, the base stations may e.g. be arranged to operate in the sequential order A-B-A- . . . , A-B-C-A- . . . , A-B-C-D-A- . . . , A-B-C-D-E-A- . . . , or the like, depending on the number of sub-bands/channels used. Other orders are also feasible.

The more sub-bands/channels being used, the greater the separation between the base stations, and the less the interference.

The sub-bands/channels preferably have non-overlapping frequency ranges. All of the sub-bands/channels preferably have a frequency range exceeding 1 GHz, and more preferably exceeding 1.5 GHz, and most preferably exceeding 2 GHz. Such a relatively broad frequency range improves the quality of the communication. In particular, such broad frequency range channels are less sensitive to doppler shift.

The base stations are connected together in a backbone communication path. This communication path is further connected to an exterior network, enabling communication with at least one stationary communication server outside the tube/tunnel. To this end, the backbone communication path may be connected to an antenna provided externally of the tube/tunnel.

The backbone communication path may comprise a wired communication path extending along at least a part of the tube/tunnel. This wired communication path may e.g. comprise a fiber optical cable. However, the communication path may also comprise a metal conductor cable, such as twisted pair cables, coaxial cables or the like. The backbone communication path may be arranged inside the tube/tunnel, but alternatively, the backbone communication path may be arranged partly or entirely outside the tube/tunnel. However, alternatively, the backbone communication path may, at least partly, comprise a wireless communication path extending from base station to base station within the tube/tunnel. Possibly, such a wireless communication may be provided via the moving capsule, e.g. as a daisy-chain, since the size of the capsule in relation to the tunnel diameter may otherwise at least partly block the communication directly from a base station to another, adjacent base station. Typical dimensions for the tunnel diameter could be 4 meter, and typical dimensions for the capsule diameter could be about 2.5-3 meter.

The antennas of the capsule, connected to the router for communication with the base stations, are preferably provided in the forward and backward end of the capsule, directed in a forward and backward direction, respectively, in relation to the travelling direction. The antennas may be arranged on the front and back sides of the capsule, but may additionally or alternatively be provided on the roof.

The router of the moving capsule may be arranged to communicate with base stations only in front of the capsule, i.e. ahead of the capsule in the travelling direction, base stations only behind the capsule, i.e. rearward or the capsule in the travelling direction, or base stations both in a forward and backward direction.

In case the router in the capsule is arranged to communicate both in a forward and backward direction, the router may communicate with base stations in the forward and backward direction simultaneously. Hereby, different data streams may be assigned to different base stations. Alternatively, the data streams may be divided between the base stations, to be aggregated together by a receiving aggregation server.

The base stations may be provided in any locations available within the tunnel, such as on the sidewalls, the roof or the like. In some embodiments, at least some of the access points are arranged in cavities extending out from the general circumference of the tunnel, such as in manholes and the like. The base stations need not have a direct line-of-sight with the capsule, since the tunnel walls are generally reflective, and will provide communication with a random line-of-sight.

The moving capsule preferably has antennas arranged directed in a forward and backward direction, and preferably arranged in a front and back end of the capsule.

The router of the moving capsule is preferably capable of communication with both a base station in the forward direction of the moving capsule and a base station in the backward direction of the moving capsule.

The router of the moving capsule is preferably capable of simultaneous communication with both a base station in the forward direction of the moving capsule and a base station in the backward direction of the moving capsule, thereby providing two concurrently useable data links. Additionally, or alternatively, the router may also be arranged to communicate simultaneously with more than one base station in the forward direction and/or more than one base station in the backward direction, and thereby also providing two concurrently useable data links.

To this end, the access points/base stations are preferably arranged so that there is at least some overlap between the coverage areas for neighboring access points/base stations. When a capsule travels through this overlap area, a conventional handover may be performed from the previously passed access point/base station to the access point/base station ahead of the capsule.

However, by means of the present invention, the coverage areas of the access points/base stations can be greatly extended, and consequently a relatively large overlap area can easily be provided between even much separated access points/base stations.

The system may further comprise an aggregation server arranged to aggregate data communicated over links provided by communication with base stations in the forward and backward directions. Aggregation means that multiple wireless links are aggregated for simultaneous use by means of routing traffic on said links through a shared virtual connection to and from a gateway, which is a stationary computer acting as a server—an aggregation server—on the Internet. This method, hereinafter referred to as "aggregation", greatly improves the reliability of high-bandwidth wireless communication for the capsule. Aggregation is the state and process whereby data streams between on-board clients and external stationary servers are jointly managed, preferably by a special protocol, between the router and the aggregation gateway/aggregation server. In reality, aggregated traffic passes through ISP infrastructure servers on its way to and from the aggregation gateway, but the virtual connection makes it appear to a third party, such as a web site, that all communications are taking place between that site and the aggregation gateway. This is advantageous because the aggregation gateway has a single, stable IP address and because streams of data can be moved from one physical link to another with minimal disruption, since the various links can be monitored both from the router and from the gateway.

The communication between the base stations and the moving capsule is made in accordance with a IEEE 802.11 standard, and preferably the IEEE 802.11ad or 802.11ag standard.

A controller in at least one of the base stations may be arranged to set a timeout parameter within the IEEE 802.11 standard to a default value exceeding a maximum propagation time between neighboring base stations along the capsule travelling path.

According to one embodiment, a controller in at least one of the base stations is arranged to perform the steps:

a) setting a current value for a timeout parameter within the IEEE 802.11 standard to a default maximum value exceeding a maximum propagation time between neighboring base stations along the capsule travelling path;
b) determining when a mobile router is within the range of a first base station;
c) determining a roundtrip time for communication between the first base station and the mobile router;
d) setting a new current value in dependence on said roundtrip time, and preferably as a value between said roundtrip time and said previously used current value, and most preferably as the sum of said determined roundtrip time and a predetermined constant;
e) use the new current value as the timeout parameter for a determined time period; and
e) repeating at least steps b-f, and preferably steps a-f.

The timeout parameter may be at least one of acknowledgment (ACK) timeout and slot time, and preferably both.

The "roundtrip time" generally correspond to the time it takes for the end of a data packet or frame to propagate from a sender to a receiver, and for a acknowledgment (ACK) packet or frame to propagate back to the sender. Since radio waves propagate at approximately 300 meters per µs, the roundtrip time is primarily dependent on the distance between the sender and the receiver.

Hereby, the timeout of the WLAN standard, such as the 802.11 standard, may be controlled very efficiently, and this control can be implemented very cost-efficiently. It can e.g. be realized solely or to a large extent in software and e.g. controlled on the MAC layer. Further, this improved control renders it possible to communicate with WLAN between a moving capsule and access points/base stations distributed along the tunnel over very long distances.

It is per se known that e.g. the default ACK timeout in 802.11 renders it difficult to communicate with access points being more than a certain distance away, such as being more than 2-300 meters away. This problem has e.g. been addressed in U.S. Pat. No. 7,483,412. However, the therein proposed solution is only suitable and useable for wireless devices that are stationary or rarely moved in relation to the access point. It is not suitable for fast moving vehicles, such as trains, with a constantly varying distance to the access points.

The default maximum value of the timeout parameter, and in particular when this parameter is ACK timeout, may e.g. be in the range 20-300 µs, and preferably in the range 50-200 µs, and most preferably in the range 75-123 µs, such as 100 µs.

The new solution provides efficient WLAN communication when the access points/base stations are provided more than 1 km apart along the tunnel, and even when more than 5 km apart, and more than 10 km apart, and more than 20 km apart.

Preferably, the access points/base stations are arranged with a separating distance in the range 1-20 km, and more preferably in the range 2-20 km, and most preferably in the range 5-20 km, such as 10-20 km.

In the first alternative discussed above, a fixed, very long timeout value may be set. This enable communication over long distances, but may lower the throughput and performance. In the second alternative, the timeout, and preferably also the slot time, are controlled dynamically, either continuously or periodically, thereby providing a suitable timeout value both at close ranges and long range, as well as in intermediate positions. Further, by initially setting a long timeout, and preferably also a long slot time, it is ensured that the timeout is always long enough, and every access point that becomes accessible from the capsule will also, at first, be far away, and gradually come closer as the capsule moves along the capsule travelling path. Hereby, not only does this provide a possibility to communicate via WLAN at greater distances, but also dramatically improves throughput both at close, medium and long ranges.

Step a) of the method may also include setting a current SlotTime to a default maximum value, and wherein step d) also includes setting the current SlotTime to a new, lower value, in dependence of the determined roundtrip time. Hereby, the performance is improved even further. Adjustment and re-setting of SlotTime is in particular advantageous for collision avoidance when multiple routers are connected to the same access point. Further, in many WLAN standards, a station is only allowed to transmit at the beginning of the SlotTime, so this time preferably also adjusted when the capsule and access point are far apart, for optimization of the performance.

By SlotTime is meant the basic unit of defining defined by the WLAN standard. This generally correspond to the time required to sense the end of a frame, start transmitting and for the beginning of the frame to propagate to the receiver. This may e.g. be equal to RxTx Turnaround Time+Channel Sensing Time+Propagation Delay+MAC processing time. The default value of SlotTime is generally set to a few microseconds. The default maximum value of the SlotTime as set in the method of the present invention may e.g. be in the range 20-200 µs, and preferably in the range 50-100 µs, and most preferably in the range 60-90 µs, such as 750 µs.

The step of repeating steps b-d, and preferably steps a-d, is preferably made periodically, at regular time intervals or after a certain waiting time after having completed the repetition. Hereby, the method allows the communication to operate with the newly set parameter value(s) for a certain time period, before performing a new repetition, and a new possible adjustment of the value(s). This improves the performance. The time intervals or the waiting time can preferably be set to a value within the range 0.1-100 seconds, and preferably in the range 0.2-10 seconds, and most preferably in the range 0.5-5 seconds, such as about 1 second.

Preferably the time parameters, such as ACK timeout and SlotTime, are set to be the same at both the router and the access point for each communication session. Further, in case several mobile routers are having communication sessions with an access point simultaneously, the time parameters are preferably the same for all such mobile routers for the communication with this access point.

The method may be performed in either the router or in the access points. The method may further comprise transmitting newly set current value(s) to the associated mobile router(s) or access points. Hereby, new adjusted values are e.g. determined for an access point, and communicated to the one or several routers communicating with said access point (or vice versa, if the adjusted values are determined in the router). However, the method may also be operated independently in both the capsule and in the access point network, so that each independently determines what time parameter settings to use.

The new current value may be set as the sum of said determined roundtrip time and a predetermined constant. Thus, the ACK timeout may e.g. be set as the roundtrip time+C, where C is a constant. C is preferably in the range 0.1-10 µs, and more preferably in the range 0.2-5 µs, and most preferably in the range 0.5-2 µs, such as about 1 µs.

The setting of values for the timeout parameter is preferably made at a Medium Access Control (MAC) layer of the OSI model.

The roundtrip time is preferably determined by estimating the time elapsing between sending out a packet or frame and receiving a corresponding ACK packet or frame in response.

However, additionally or alternatively, the roundtrip time may be estimated based on an estimate of the distance between the mobile router and the first access point, based on otherwise known position data for the capsule within the tunnel.

According to another aspect of the present invention, there is provided a mobile router arranged in a moving capsule for transportation within an evacuated tube transportation system, wherein the evacuated transportation system comprises a tube or tunnel which is at least partly evacuated to provide a low-pressure within the tube/tunnel, and a guiding structure to guide the moving capsule along the tube/tunnel, wherein the mobile router is arranged to communicate with base stations arranged on the inside of the tube/tunnel, wherein the mobile router is arranged to communicate with the base stations in a frequency band in the range of 55-75 GHz, and preferably in a frequency band around 60 GHz.

With this aspect of the invention, similar advantages and preferred features are present as in the previously discussed first aspect of the invention.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. The base stations arranged in the evacuated tube transportation system will be referred to both as base stations and as access points.

Figure 1:
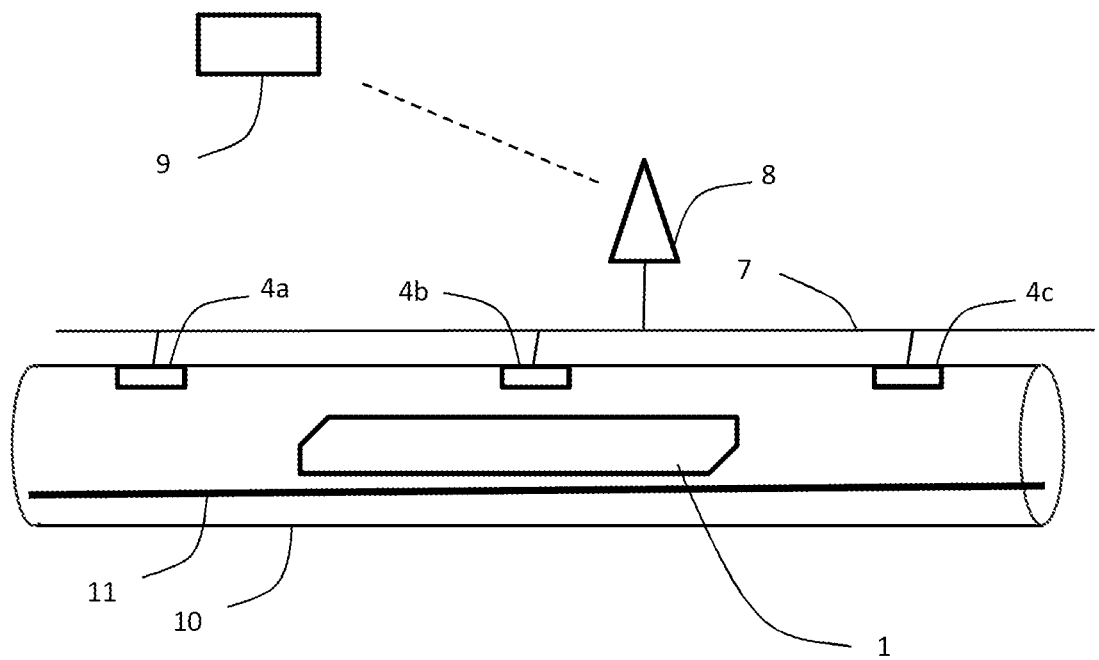
FIG. 1 is a schematic side-view illustrating a wireless communication system for an evacuated tube transportation system in accordance with an embodiment of the present invention.

With reference to FIG. 1, a wireless communication system for an evacuated tube transportation system comprises a tube or tunnel 10 which is at least partly evacuated to provide a low-pressure within the tube/tunnel, and a guiding structure 11 to guide a moving capsule 1 along the tube/tunnel. The wireless communication system comprises a plurality of base stations or access points 4a-c arranged on the inside of the tube/tunnel, distributed along the length of the tube/tunnel, and connected together in a backbone communication path 7. The communication path can e.g. be an Ethernet backbone, but can also be provided in other ways. The communication path is connected to an exterior network, e.g. through a ground base station or gateway 8, enabling communication with at least one stationary communication server 9 outside the tube/tunnel. The communication path may e.g. be connected to the internet through terrestrial base stations or wired connections, in a per se conventional way.

The backbone communication path may comprise a wired communication path extending along at least a part of the tube/tunnel. The wired communication path may e.g. comprise a fiber optical cable. However, the communication path may also comprise a metal conductor cable, such as twisted pair cables, coaxial cables or the like. The backbone communication path may be arranged inside the tube/tunnel, but alternatively, the backbone communication path may be arranged partly or entirely outside the tube/tunnel.

Alternatively, the backbone communication path may, at least partly, comprise a wireless communication path extending from base station to base station within the tube/tunnel. Possibly, such a wireless communication may also be provided via the moving capsule, e.g. as a daisy-chain.

The base stations may be provided in any locations available within the tunnel, such as on the sidewalls, the roof or the like. In some embodiments, at least some of the access points are arranged in cavities extending out from the general circumference of the tunnel, such as in manholes and the like.

Figure 2:
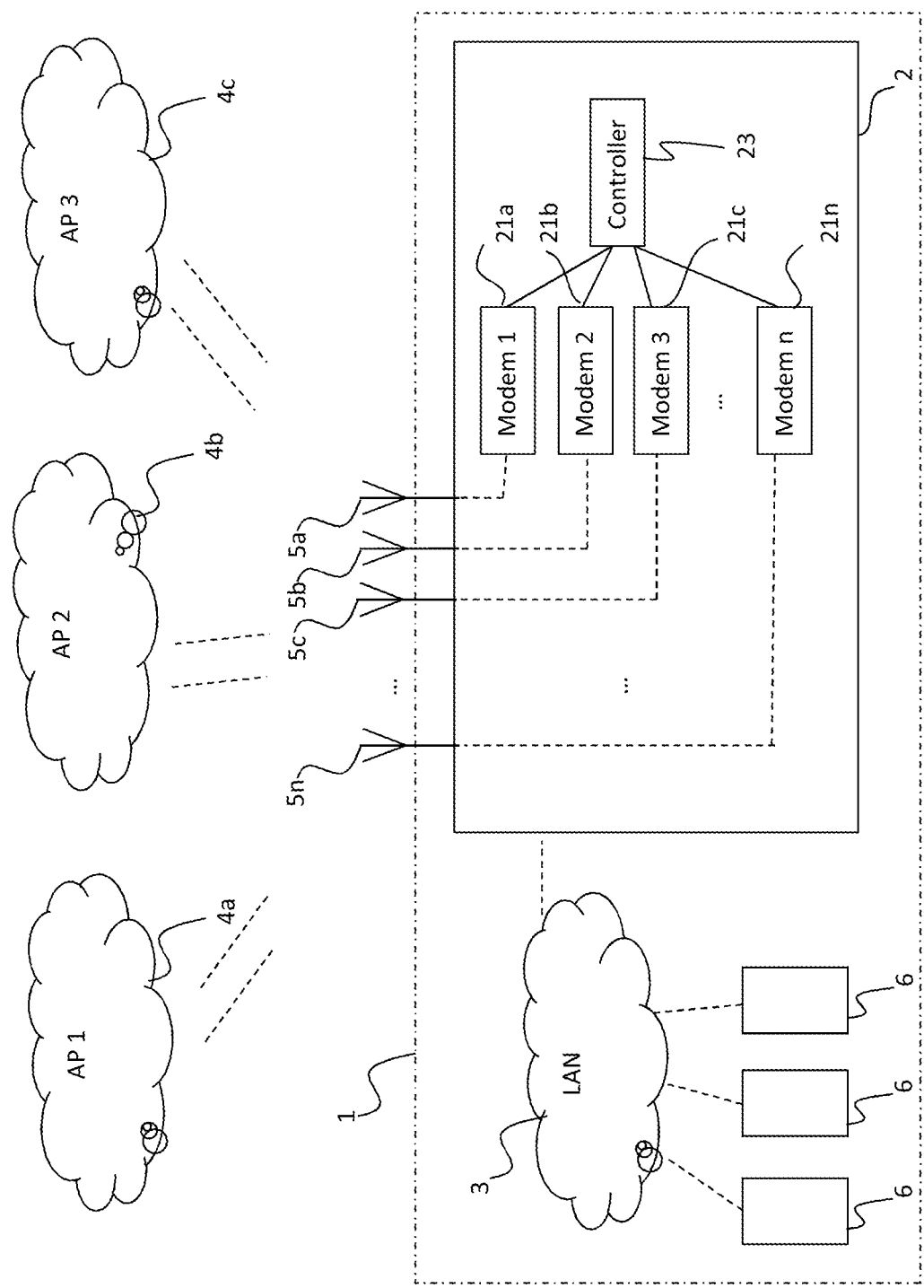
FIG. 2 is schematic illustration of the wireless communication system for an evacuated tube transportation system of FIG. 1, illustrating the capsule in more detail, in accordance with an embodiment of the present invention.
Figure 4A:
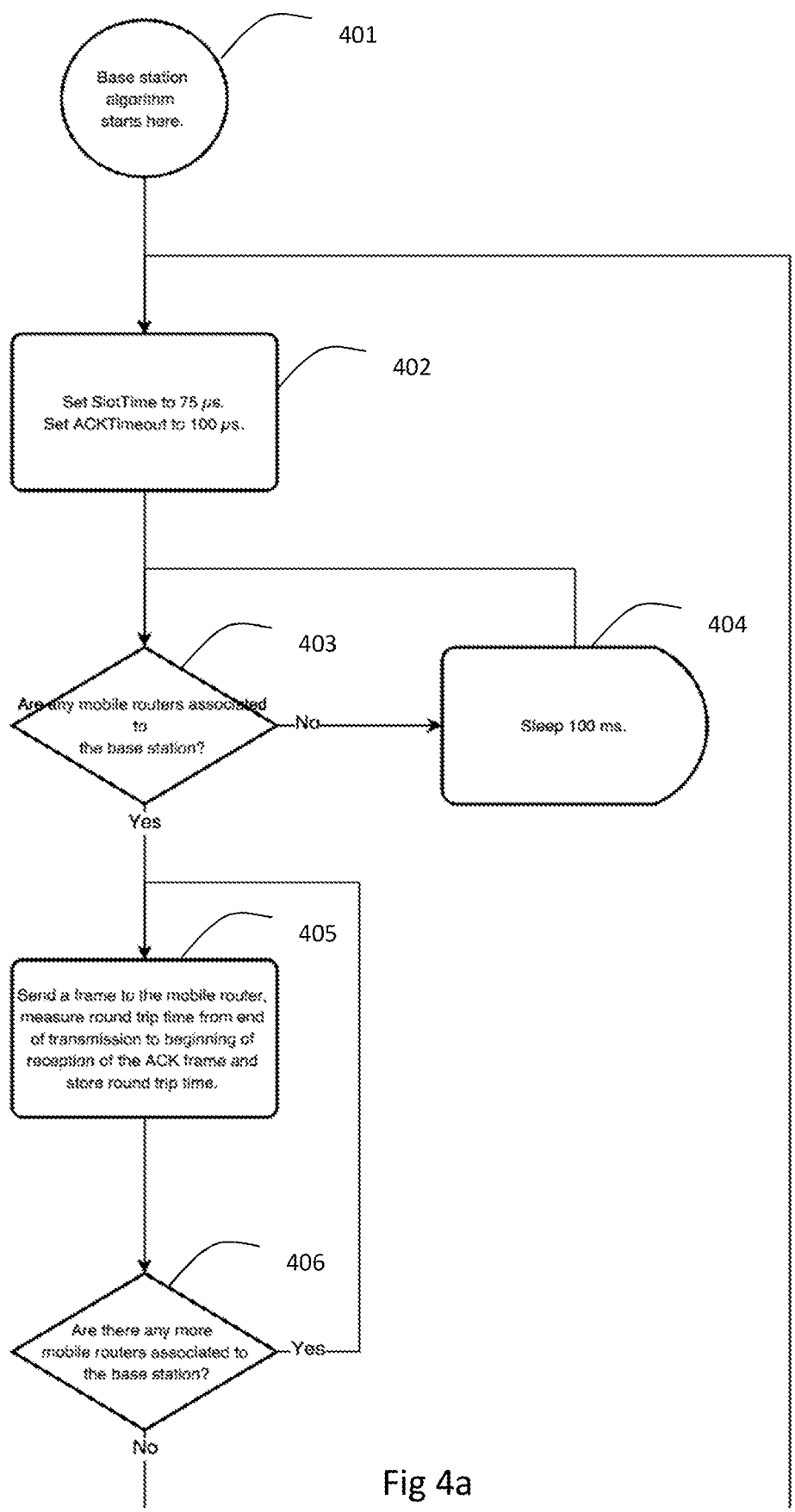
FIGS. 4a and 4b illustrate a schematic flow chart of an exemplary process to be performed by the wireless network, in accordance with an embodiment of the invention.
Figure 4B:
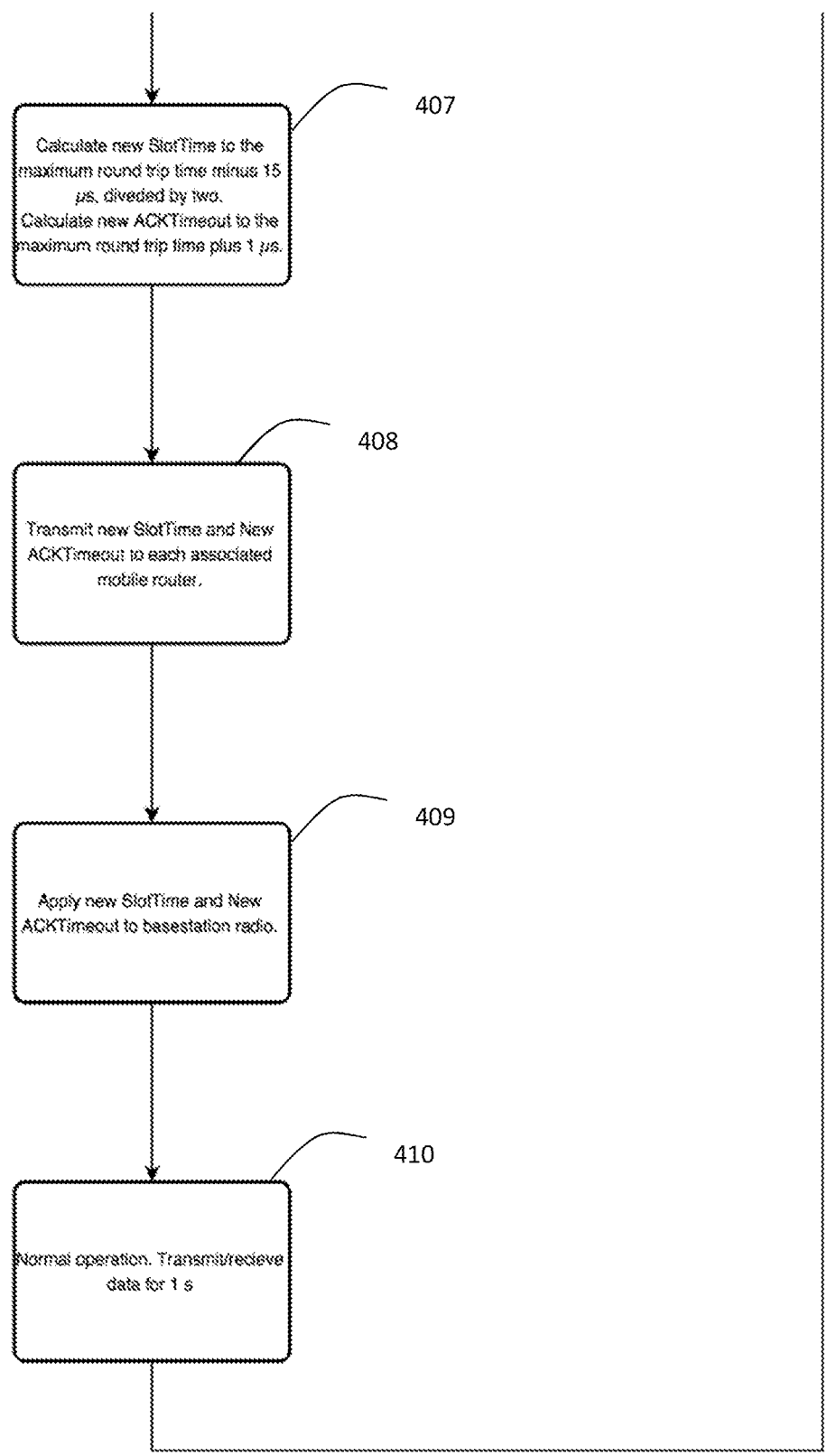
Figure 5A:
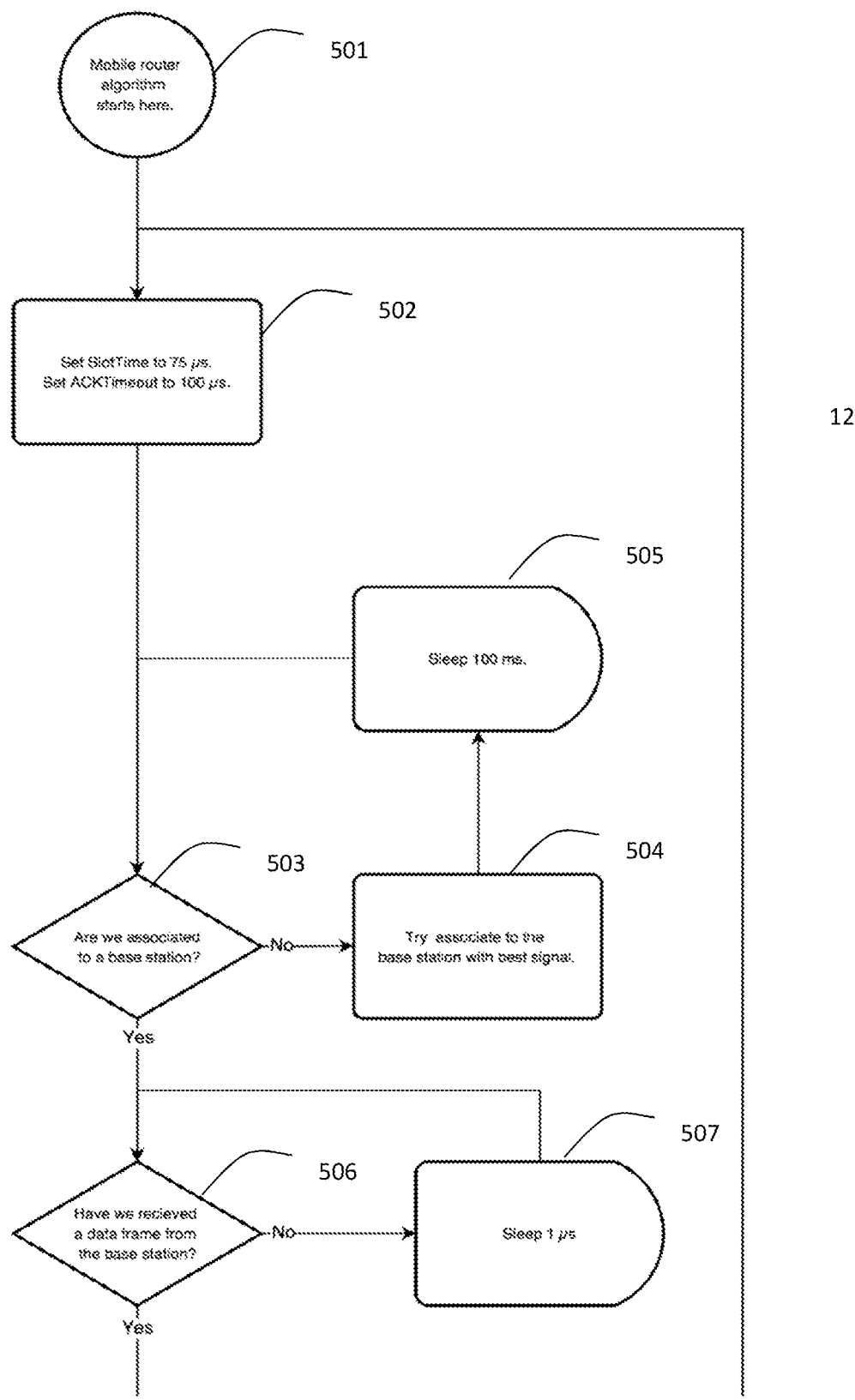
FIGS. 5a and 5b illustrate a schematic flow chart of another exemplary process to be performed by the mobile router, in accordance with an embodiment of the invention.
Figure 5B:
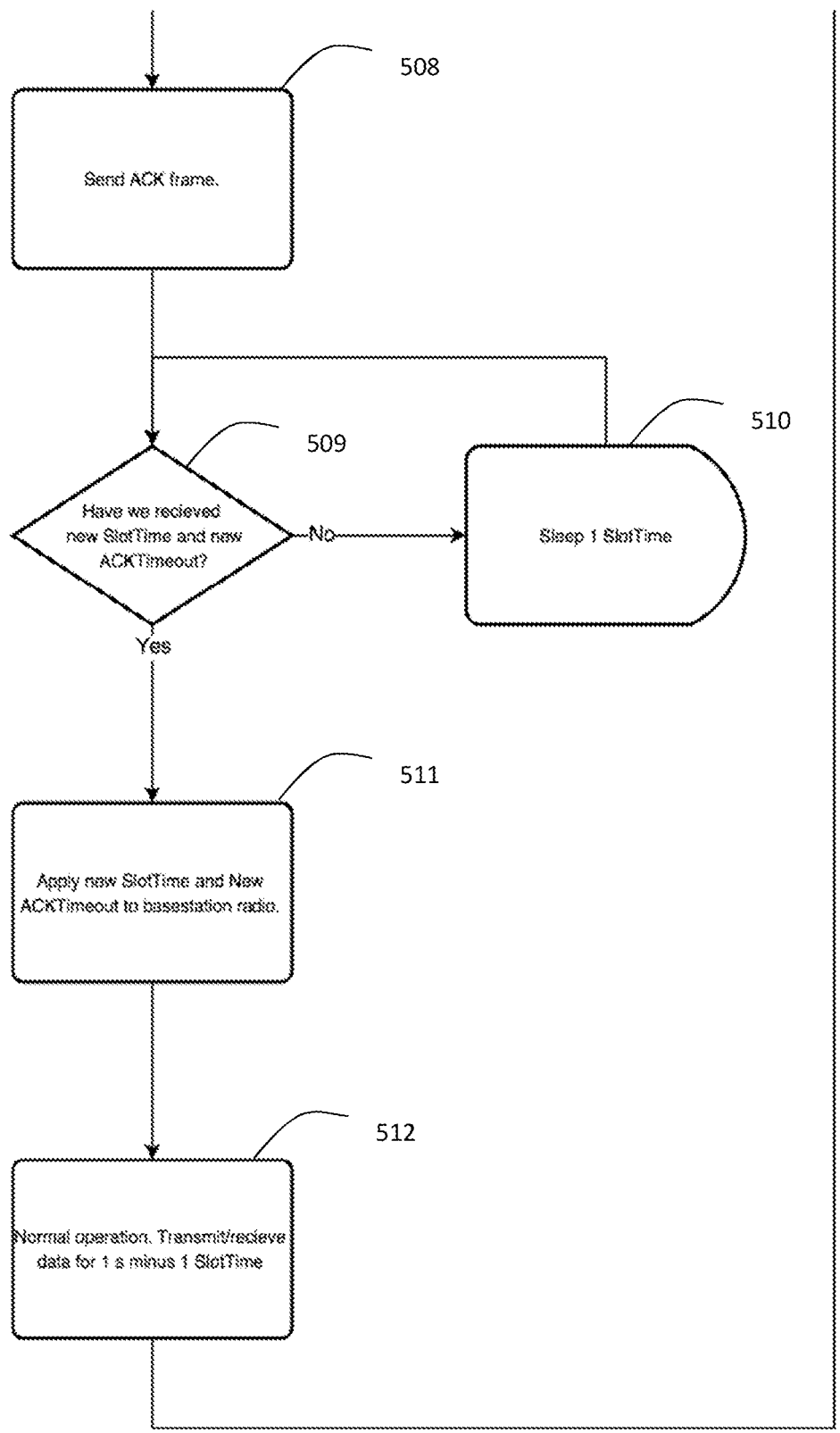

In FIG. 2 a schematic illustration of a capsule 1, also referable to as a pod, having a communication system, is provided. The communication system comprises a data communication router 2 for receiving and transmitting data between an internal local area network (LAN) 3, and one or several external base stations, or access points, 4a, 4b, 4c, which are connected to the backbone communication path. The communication between the router and the access points can e.g. be made in compliance with a Wireless Local Area Network (WLAN) standard, such as an 802.11 standard.

Communication to and from the access points is provided through one or several antennas 5a-n arranged on the capsule. The antennas may be arranged on the roof of the capsules, but are in a preferred embodiment arranged at or in the vicinity of the front end and/or the rear end of the capsule. Two or more data links are preferably available, either between the capsule and one of the access points, and/or by using several access points simultaneously.

The LAN is preferably a wireless network, using one or several internal antennas to communicate with terminal units 6 within the capsule. It is also possible to use a wired network within the capsule. The LAN may be set-up as wireless access point(s). The client(s) 6 may be computing devices such as laptops, mobiles telephones, PDAs, tablets and so on.

The data communication router further preferably comprises a plurality of modems 21a-n. Assignment of data streams to different access points and/or to different data links on one access point is controlled by a controller 23. The controller is preferably realized as a software controlled processor. However, the controller may alternatively be realized wholly or partly in hardware.

The system may also comprise a position determining unit, for receiving position signals from a general control system for the evacuated tube transportation system, indicative of the current position of the capsule, and wherein the controller may be arranged to control in particular the performance of the communication with the base stations in the tunnel in accordance with the capsule's position determined based on the position signals.

The data communication router may also be denominated MAR (Mobile Access Router) or MAAR (Mobile Access and Applications Router).

In particular, the communication between the base stations and the moving capsule may be provided in a frequency band in the range of 55-75 GHz, and preferably in a frequency band around 60 GHz.

In one embodiment, at least some of the base stations communicate with the moving capsule at different sub-bands or channels within the used frequency band. Hereby, the interference between the base-stations is reduced, and it is easier for the capsule to distinguish between the communication from different base stations.

In one embodiment, one of the communication standards IEEE 802.11ad and IEEE 802.11ag may be used. If, for example, the IEEE 802.11ad or IEEE 802.11ag standards are used, these standards define such different sub-bands/channels.

Thus, all base stations may e.g. communicate with the moving capsule at different sub-bands/channels, so that no neighboring base stations communicates on the same sub-bands/channels. Thus, in one embodiment, every base station is arranged to communicate with the moving capsule at a different sub-band/channel than any of the first and second neighbor base stations.

For example, the base stations located after each other along the evacuated tube may be arranged to operate at the different sub-bands/channels in a sequential order, wherein the sequential order comprises at least two different sub-bands/channels, and more preferably at least three different sub-bands/channels, and most preferably at least four sub-bands/channels. If e.g. two sub-bands/channels are used, every other base station may be using a first sub-band/channel, A, and the others using a second sub-band/channel, B, to form the sequential order A-B-A-B-A- . . . . Thus, the base stations may e.g. be arranged to operate in the sequential order A-B-A- . . . , A-B-C-A- . . . , A-B-C-D-A- . . . , A-B-C-D-E-A- . . . , or the like, depending on the number of sub-bands/channels used. Other orders are also feasible. The more sub-bands/channels being used, the greater the separation between the base stations, and the less the interference.

The sub-bands/channels preferably have non-overlapping frequency ranges. All of the sub-bands/channels preferably have a frequency range exceeding 1 GHz, and more preferably exceeding 1.5 GHz, and most preferably exceeding 2 GHz.

Figure 3:
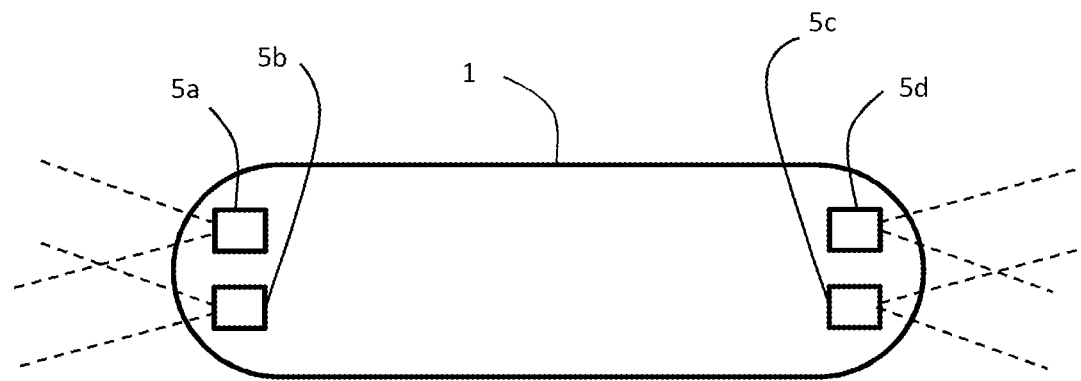
FIG. 3 is a schematic top view illustration of an exemplary antenna configuration to be used on capsules in the systems of FIGS. 1 and 2.

As illustrated in FIG. 3, the antennas 5a-d of the capsule 1, connected to the router for communication with the base stations, are preferably provided in the forward and backward end of the capsule, directed in a forward and backward direction, respectively, in relation to the travelling direction.

The antennas may be arranged on the front and back sides of the capsule, but may additionally or alternatively be provided on the roof.

In the illustrative example of FIG. 3, there are two antennas 5a, 5b, provided at the front end of the capsule, and two antennas 5c, 5d, provided at the back end of the capsule. However, other configurations are also feasible, such as having more than two antennas at each end, having only one antenna at each end, having antennas only at one of the ends, or having different numbers of antennas at the two ends. In one embodiment, three antennas are provided at each end, and in another embodiment, four antennas are provided at each end.

The router of the moving capsule may be arranged to communicate with base stations only in front of the capsule, i.e. ahead of the capsule in the travelling direction, base stations only behind the capsule, i.e. rearward or the capsule in the travelling direction, or base stations both in a forward and backward direction.

In case the router in the capsule is arranged to communicate both in a forward and backward direction, the router may communicate with base stations in the forward and backward direction simultaneously. Hereby, different data streams may be assigned to different base stations. Alternatively, the data streams may be divided between the base stations, to be aggregated together by a receiving aggregation server.

The router of the moving capsule is preferably capable of communication with both a base station in the forward direction of the moving capsule and a base station in the backward direction of the moving capsule.

The router of the moving capsule is preferably capable of simultaneous communication with both a base station in the forward direction of the moving capsule and a base station in the backward direction of the moving capsule, thereby providing two concurrently useable data links. Additionally, or alternatively, the router may also be arranged to communicate simultaneously with more than one base station in the forward direction and/or more than one base station in the backward direction, and thereby also providing two concurrently useable data links.

The access points/base stations are preferably arranged so that there is at least some overlap between the coverage areas for neighboring access points/base stations. When a capsule travels through this overlap area, a conventional handover may be performed from the previously passed access point/base station to the access point/base station ahead of the capsule, but the two base stations may also be used simultaneously, as two concurrently useable data links. Preferably, a relatively large overlap area is provided between the access points/base stations.

Preferably, there is an overlap for the coverage areas of at least two, and preferably at least three or at least four, base stations over the whole, or essentially the whole, extension of the tube/tunnel. The overlapping coverage areas allow the mobile router of the capsule to access several access points simultaneously, and thereby distribute the communication between several data links.

An exemplary embodiment for communicating with the access points in the tunnel/tube will now be described with reference to FIGS. 4a-b and 5a-b. In this method, a dynamic adjustment is made for certain timeout parameters in dependence of the distance between the capsule and the access points. The method is preferably performed in the MAC layer of the 802.11 standard. By optimization performed both in the access point network and in the mobile router of the capsule(s), a very efficient communication is obtained. The method is preferably executed in software.

In the following exemplary embodiment, the adjustments are determined by the access point network, and communicated to the mobile router(s) on the capsule(s). However, as discussed in the foregoing, the adjustments may also be made in the mobile routers, or in both the access point network and the mobile routers, independently or in a synchronized fashion.

In FIG. 4, an operational method for an access point in the access point network is illustrated. The process starts in step 401. In a first step, 402, the ACK timeout and the SlotTime are set to maximum values. The maximum values are values set in accordance with the maximum roundtrip time between mobile routers and access points along the capsule travelling path. Thus, these values are set in accordance with the maximum air propagation time for the greatest possible distance to be covered. For example, the maximum ACK timeout may be set to 100 μs, and the SlotTime may be set to 75 μs.

In a following step, 403, it is determined whether any mobile routers are associated with the base station/access point, i.e. whether any capsules are within the coverage area. If not, the process proceeds to a wait time, e.g. 100 ms, and is then repeated. This is repeated until a mobile router is detected. When one or several mobile router(s) is detected and associated with the base station, the process proceeds to step 405.

In step 405, a roundtrip time is determined. This is done by sequentially sending a frame or packet to each mobile router. A timer is used to determine the roundtrip time from when the frame/packet is sent and until an ACK frame/packet is received from the mobile router. This timer has a timeout corresponding to the maximum ACK timeout set previously.

In step 406 it is determined whether any more mobile routers are currently associated with the access point, and if so, step 405 is repeated.

When the access point/base station has received ACKs from all associated mobile routers, new values for ACK timeout and SlotTime are determined, step 407. The new ACK timeout and SlotTime are determined based on the longest roundtrip time for the associated mobile routers. The new ACK timeout may then be determined to be the longest roundtrip time plus a constant, such as 1 μs. The new SlotTime may be determined to be the longest roundtrip reduced by a constant, such as 15 μs, and then divided by 2. Thus, the following may apply:

SlotTime=(RoundTripTime−15 μs)/2

ACKtimeout=RoundTripTime+1 μs.

In a following step, 408, the new ACK timeout value and SlotTime value are communicated to the mobile router(s). When all the mobile routers have received the new settings, these are also set for the access point/base station, step 409.

The process then assumes an operating period, or waiting period, e.g. for 1 second, during which the new settings are applied and used, with normal exchange of data in accordance with the WLAN standard (such as the 802.11 standard).

When the waiting period comes to an end, the process returns to step 402, and the process is repeated.

The mobile routers may be operated according to the same process as described above for the access point network. However, preferably the mobile routers are running a software program which ensures that the mobile routers are synchronized with the access point(s), so that the same parameter settings are used on both sides. An example of such a process will be discussed in the following.

In FIG. 5, an operational method for a mobile router on a capsule is illustrated. The process starts in step 501. In a first step, 502, the ACK timeout and the SlotTime are set to maximum values. The maximum values are values set in accordance with the maximum roundtrip time between mobile routers and access points along the capsule travelling path. Thus, these values are set in accordance with the maximum propagation time for the greatest possible distance to be covered. For example, the maximum ACK timeout may be set to 100 μs, and the SlotTime may be set to 75 μs. The maximum ACK timeous and SlotTime are preferably set to identical values as used in the access points.

In a following step, 503, it is determined whether the mobile router is associated with a base station/access point, i.e. whether any access point is within the coverage area. If not, the process tries to establish contact with the access point/base station having the best signals, step 504. The process then proceeds to a wait time, e.g. 100 ms, step 505, and is then repeated from step 503. This is repeated until the mobile router is associated with an access point/base station.

When associated with an access point/base station, it is determined whether a data frame/packet has been received from the access point/base station, step 506. If not, the process proceeds with another waiting period, e.g. having a duration of 1 μs, step 507. This loop is repeated from step 506 until a data frame/packet has been received during the last iteration.

When a data frame/packet has been received, an ACK is sent in return, step 508.

It is then determined whether a new ACK timeout and SlotTime has been received from the access point/base station, step 509. If not, the process proceeds with another waiting period, e.g. having a duration of one SlotTime (which is at this step the maximum SlotTime of 75 μs), step 510. This loop is repeated from step 509 until new ACK timeout and SlotTime parameters have been received.

When new ACK timeout and SlotTime have been received, these new parameter settings are applied for the communication with this particular access point/base station, step 511.

The mobile routers then proceeds with normal communication with the access point/base station, sending and receiving data, for a time period controlled by a timer and having a corresponding duration as for the base station (1 s minus 1 SlotTime in this case), step 512.

After this period of normal operation using the new parameters and running the 802.11 protocol in conventional mode, the process is repeated from step 502.

As discussed in the foregoing, the mobile routers may be arranged to communicate with two or more access points simultaneously. In this case, the same processes are run in parallel, one for each access point.

The two processes described above ensures that the parameter settings are optimized in correspondence with the distance during most of the time, thereby providing close to optimal throughput and minimizing the waiting times stipulated by the 802.11 MAC protocol between data frames. At the same time, the processes ensures that new mobile routers appearing in the outskirts of the access range of the access points are regularly detected, and are consequently taken into account.

The waiting times exemplified above may naturally be set differently for various applications and embodiments. Here, a tradeoff should preferably be made between the time spent sending useful data with close to optimal performance, and the time spent updating the parameters and searching for new mobile routers and access points. The settings are dependent on e.g. the distance between the access points, the speed of the capsule, etc. The exemplified processes has a granularity in the time domain of 1 µs, which corresponds to 300 m for one trip in the distance domain, or 150 m for return trips. The time duration for normal operation here exemplified as 1 second is generally an adequate setting for most practical applications. However, for capsules moving at very high speed, shorter time durations may also be used, such as 0.5 seconds, or 0.3 seconds.

The invention has now been described with reference to specific embodiments. However, several variations of the communication system/method are feasible. For example, the present invention has here been disclosed in relation to capsules travelling in evacuated tubes. However, capsules should be construed broadly, to mean any form of vehicle travelling in such evacuated tubes/tunnels, such as trains. The wireless communication system is of particular importance for vehicles intended for passenger traffic, but may also be used for cargo vehicles and the like. Further, the examples are mostly related to the 802.11 standard, but other WLAN protocols may also be used in the same or similar ways, and also other per se known communication standards. Further, the settings used may differ between various applications.

Further, the above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

What is claimed is:

1. A wireless communication system for an evacuated tube transportation system,
    wherein the evacuated transportation system comprises a tube or tunnel which is at least partly evacuated to provide a low-pressure within the tube/tunnel, and a guiding structure to guide a moving capsule along the tube/tunnel,
    wherein the wireless communication system comprises a plurality of base stations arranged on the inside of the tube/tunnel, distributed along the length of the tube/tunnel, and connected together in a backbone communication path, the communication path further being connected to an exterior network, enabling communication with at least one stationary communication server outside the tube/tunnel, and
    wherein the moving capsule comprises a router for communication with said base stations, wherein the tube/tunnel has walls which are inwardly reflective for electromagnetic radiation, wherein the base stations are provided more than 1 km apart along the tube/tunnel, and wherein at least some of the base stations simultaneously communicate with the moving capsule at different sub-bands or channels within a frequency band.

2. The wireless communication system of claim 1, wherein the communication between the base stations and the moving capsule is provided in the frequency band in the range of 55-75 GHz.

3. The wireless communication system of claim 1, wherein the communication between the base stations and the moving capsule is provided in the frequency band around 60 GHz.

4. The wireless communication system of claim 1, wherein adjacent base stations are arranged to communicate with the moving capsule at the different sub-bands/channels within the frequency band.

5. The wireless communication system of claim 1, wherein every base station is arranged to communicate with the moving capsule at a different sub-band/channel than any neighbor base stations.

6. The wireless communication system of claim 1, wherein the at least some of the base stations are arranged to operate at the different sub-bands/channels in a sequential order, wherein the sequential order comprises at least two different sub-bands/channels.

7. The wireless communication system of claim 1, wherein the at least some of the base stations are arranged to operate at the different sub-bands/channels in a sequential order, wherein the sequential order comprises at least three different sub-bands/channels.

8. The wireless communication system of claim 1, wherein the different sub-bands/channels within the frequency band have non-overlapping frequency ranges.

9. The wireless communication system of claim 1, wherein the backbone communication path comprises a wired communication path extending along at least a part of the tube/tunnel.

10. The wireless communication system of claim 9, wherein the wired communication path comprises a fiber optical cable.

11. The wireless communication system of claim 1, wherein the backbone communication path comprises a wireless communication path extending from base station to base station within the tube/tunnel.

12. The wireless communication system of claim 1, wherein the moving capsule has antennas arranged directed in a forward and backward direction.

13. The wireless communication system of claim 1, wherein the router of the moving capsule is capable of communication with both a first base station of the plurality of base stations in the forward direction of the moving capsule and a second base station of the plurality of base stations in the backward direction of the moving capsule.

14. The wireless communication system of claim 1, wherein the router of the moving capsule is capable of simultaneous communication with both a first base station of the plurality of base stations in the forward direction of the moving capsule and a second base station of the plurality of base stations in the backward direction of the moving capsule, thereby providing two concurrently useable data links.

15. The wireless communication system of claim 14, wherein the system further comprises an aggregation server arranged to aggregate data communicated over links provided by communication with the first and second base stations in the forward and backward directions, respectively.

16. The wireless communication system of claim 1, wherein the communication between the base stations and the moving capsule is made in accordance with an IEEE 802.11 standard.

17. The wireless communication system of claim 16, wherein a controller in at least one of the base stations is arranged to set a timeout parameter within the IEEE 802.11 standard to a default value exceeding a maximum propagation time between neighboring base stations along a travelling path of the moving capsule.

18. The wireless communication system of claim 16, wherein a controller in at least one of the base stations is arranged to perform the steps:
 a) setting a current value for a timeout parameter within the IEEE 802.11 standard to a default maximum value exceeding a maximum propagation time between neighboring base stations along the travelling path of the moving capsule;
 b) determining when a selected router is within the range of a first base station;
 c) determining a roundtrip time for communication between the first base station and the selected router;
 d) setting a new current value in dependence on said roundtrip time, and preferably as a value between said roundtrip time and said previously used current value, and most preferably as the sum of said determined roundtrip time and a predetermined constant;
 e) using the new current value as the timeout parameter for a determined time period; and
 e) repeating at least steps b-f.

19. The wireless communication system of claim 17, wherein the timeout parameter is at least one of acknowledgment (ACK) timeout and slot time.

20. The wireless communication system of claim 18, wherein step e) comprises repeating steps a-f.

21. The wireless communication system of claim 1, wherein the router of the moving capsule is capable of simultaneous communication with at least two different base stations, thereby providing at least two concurrently useable data links.

22. The wireless communication system of claim 1, wherein the base stations are arranged so that there is an overlap in coverage areas for neighboring base stations.

* * * * *